US009853271B2

(12) United States Patent
Iwase et al.

(10) Patent No.: US 9,853,271 B2
(45) Date of Patent: Dec. 26, 2017

(54) BATTERY

(71) Applicant: TOYOTA JIDOSHA KABUSHIKI KAISHA, Toyota-shi, Aichi-ken (JP)

(72) Inventors: Kosuke Iwase, Nagoya (JP); Satoru Mizuno, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 28 days.

(21) Appl. No.: 15/100,463

(22) PCT Filed: Nov. 18, 2014

(86) PCT No.: PCT/JP2014/005784
§ 371 (c)(1),
(2) Date: May 31, 2016

(87) PCT Pub. No.: WO2015/087491
PCT Pub. Date: Jun. 18, 2015

(65) Prior Publication Data
US 2016/0301054 A1    Oct. 13, 2016

(30) Foreign Application Priority Data
Dec. 13, 2013  (JP) .................................. 2013-258690

(51) Int. Cl.
*H01M 2/16*    (2006.01)
*H01M 10/04*    (2006.01)
(Continued)

(52) U.S. Cl.
CPC ....... *H01M 2/1673* (2013.01); *H01M 2/1606* (2013.01); *H01M 2/1613* (2013.01);
(Continued)

(58) Field of Classification Search
CPC ............. H01M 2/1673; H01M 2/1613; H01M 10/0587; H01M 10/0585; H01M 2/1606;
(Continued)

(56) References Cited

U.S. PATENT DOCUMENTS 6,468,687 B1    10/2002 Nagae et al.
2007/0184350 A1    8/2007 Kim et al.
(Continued)

FOREIGN PATENT DOCUMENTS

JP    10-284117 A    10/1998
JP    10284116 A    10/1998
(Continued)

OTHER PUBLICATIONS

International Search Report for PCT/JP2014/005784 dated Mar. 2, 2015.

*Primary Examiner* — Cynthia K Walls
(74) *Attorney, Agent, or Firm* — Sughrue Mion, PLLC

(57) ABSTRACT

A battery according to the invention includes, as a separator, a first separator and a second separator having mutually different characteristics. The first separator and the second separator are disposed inside an electrode assembly in a state where the separators are not in contact with each other in a stacking direction of the electrode assembly. The first separator and the second separator have the following characteristic: when the battery is constructed including an electrode assembly formed by stacking the positive electrode, the first separator and the negative electrode, a resistance increase rate X=Delta X/Delta P satisfies X>0 (positive value), X being evaluated from a change amount Delta P of surface pressure applied in the stacking direction of the electrode assembly and a resistance increment Delta X of the battery upon application of the surface pressure change amount Delta P, and when the battery is constructed including an electrode assembly formed by stacking the positive
(Continued)

electrode, the second separator and the negative electrode, a resistance increase rate Y=Delta Y/Delta P satisfies Y<0 (negative value), Y being evaluated from a change amount Delta P of surface pressure applied in the stacking direction of the electrode assembly and a resistance increment Delta Y of the battery upon application of the surface pressure change amount Delta P.

5 Claims, 10 Drawing Sheets

(51) Int. Cl.
  *H01M 10/0525*    (2010.01)
  *H01M 10/0585*    (2010.01)
  *H01M 10/0587*    (2010.01)

(52) U.S. Cl.
  CPC ..... *H01M 2/1653* (2013.01); *H01M 10/0413* (2013.01); *H01M 10/0431* (2013.01); *H01M 10/0525* (2013.01); *H01M 10/0585* (2013.01); *H01M 10/0587* (2013.01)

(58) Field of Classification Search
  CPC ......... H01M 10/0431; H01M 10/0413; H01M 2/1653; H01M 10/0525
  See application file for complete search history.

(56) References Cited

U.S. PATENT DOCUMENTS

| | | | |
|---|---|---|---|
| 2008/0241660 A1 | 10/2008 | Ogawa et al. | |
| 2011/0189530 A1* | 8/2011 | Torata | H01M 2/16 429/144 |

FOREIGN PATENT DOCUMENTS

| | | |
|---|---|---|
| JP | 2002025526 A | 1/2002 |
| JP | 2004-262412 A | 9/2004 |
| JP | 2005-190911 A1 | 7/2005 |
| JP | 2008-243482 A | 10/2008 |
| JP | 2013-089563 A | 5/2013 |

* cited by examiner

BATTERY

CROSS REFERENCE TO RELATED APPLICATIONS

This application is a National Stage of International Application No. PCT/JP2014/005784 filed Nov. 18, 2014, claiming priority based on Japanese Patent Application No. 2013-258690 filed Dec. 13, 2013, the contents of all of which are incorporated herein by reference in their entirety.

TECHNICAL FIELD

The present invention relates to a battery, and more particularly to a battery in which a separator is interposed between a positive electrode and a negative electrode.

The present application claims the benefit of priority based on Japanese Patent Application No. 2013-258690, filed Dec. 13, 2013, the contents whereof are incorporated in the present description by reference.

BACKGROUND ART

Secondary batteries such as lithium ion secondary batteries, nickel hydride batteries and the like have been gaining in importance in recent years as power sources installed in vehicles, or power sources in personal computers and mobile terminals. In particular, lithium ion secondary batteries, which are lightweight and afford high energy densities, are preferably used as high-output power sources installed in vehicles. In one typical configuration, such lithium ion secondary batteries are provided with a positive electrode that is formed from a lithium transition metal complex oxide, a negative electrode that is formed from a carbon material, and a separator that is disposed between the positive electrode and the negative electrode. Patent Literature 1 and Patent Literature 2 illustrate instances of conventional technologies pertaining to such separators. Patent Literature 1 discloses a separator wherein a microporous material made of a polyolefin resin is provided inside a nonwoven fabric made of glass fibers, and on at least one surface of the nonwoven fabric.

Patent Literature 2 discloses a separator formed of a microporous resin film in which insulating glass fibers or aramid fibers are dispersed in a polyolefin resin.

CITATION LIST

Patent Literature

[PTL 1]
Japanese Patent Application Publication No. 2013-089563
[PTL 2]
Japanese Patent Application Publication No. 2008-243482

SUMMARY OF INVENTION

Assembled batteries that are installed in vehicles such as automobiles are constructed in a state where multiple batteries (unit cells) are arrayed and restrained (i.e. a state in which the batteries are fixed to each other), under the premise that the assembled battery will be used in a limited installation space and while being subjected to vibration. During such restraint, a substantial surface pressure (load) is applied onto each of the batteries that make up the assembled battery. However, findings by the inventors have revealed that expansion and contraction of electrode plates, which occur due to, for instance, changes in temperature and changes in the charging state of the battery during actual use, may give rise to significant fluctuations (for instance, about plus or minus 0.5 MPa) of the surface pressure (restraining load) that acts on the batteries. Such fluctuation may in turn give rise to changes in the resistance of the battery. Also, fluctuation in battery resistance can result in reduced in battery performance. For instance, there arises the concern of poorer fuel consumption caused by reduced regenerative current when the battery resistance increases, while overcharging may occur due to increased charging current upon a drop in battery resistance. Therefore, fluctuation in battery resistance is preferably as small as possible.

The inventors found that separators are one cause of fluctuation in battery resistance accompanying surface pressure changes. Specifically, the inventors found that in the case of separators in the form of porous sheets that is formed from a polyolefin resin, the voids in the polyolefin resin are plugged, and battery resistance tends to increase, when the surface pressure that acts on the separators increases. The inventors found that in the case of separators of nonwoven fabrics, the voids are not readily plugged accompanying the above-described increase in surface pressure, but the battery resistance exhibits a downward trend nonetheless mainly due to the influence of changes in thickness. The inventors found that a battery can be obtained that exhibits less fluctuation in battery resistance accompanying changes in surface pressure, as compared with conventional batteries, by using concomitantly two types of separator that exhibit such a positive-negative reversal trend of the surface pressure dependence of battery resistance, and by exploiting interactions between the respective characteristics of the separators, and perfected the present invention on the basis of that finding.

Specifically, the battery provided by the present invention includes an electrode assembly formed by (resulting from) stacking a positive electrode, a separator and a negative electrode. The battery includes, as the separator, a first separator and a second separator having mutually different characteristics. The first separator and the second separator are disposed inside the electrode assembly in a state where the first separator and the second separator are not in contact with each other in a stacking direction of the electrode assembly.

The first separator and the second separator have the following characteristic:

in a case where the battery is constructed including an electrode assembly formed by (that results from) stacking the positive electrode, the first separator and the negative electrode, a resistance increase rate X=Delta X/Delta P satisfies X>0 (positive value), X being evaluated (worked out) from a change amount Delta P (MPa) of surface pressure applied in the stacking direction of the electrode assembly and a resistance increment Delta X (%) of the battery upon application of the surface pressure change amount Delta P, and in a case where the battery is constructed including an electrode assembly formed by (that results from) stacking the positive electrode, the second separator and the negative electrode, a resistance increase rate Y=Delta Y/Delta P satisfies Y<0 (negative value), Y being evaluated (worked out) from a change amount Delta P (MPa) of surface pressure applied in the stacking direction of the electrode assembly and a resistance increment Delta Y (%) of the battery upon application of the surface pressure change amount Delta P.

Thus, fluctuation in battery resistance does not occur readily even upon changes in the surface pressure that is applied to the separators, thanks to the concomitant use of the first separator and the second separator having mutually different resistance increase rates X, Y. Accordingly, with the configuration described above, a high-performance battery can be provided that allows eliminating various problems derived from fluctuation in battery resistance (for instance, problems of reduced regenerative current, caused by increased battery resistance, and that result in poorer fuel consumption, or problems of greater charging current, derived from reduced battery resistance, and that result in overcharging).

In a preferred aspect of the battery disclosed herein, the first separator is formed from a polyolefin resin, and the second separator is formed from a nonwoven fabric. The above-described effect can be elicited yet more pronouncedly by using concomitantly a polyolefin resin and a nonwoven fabric as the separator.

Techniques that involve using concomitantly polyolefin resins and nonwoven fabrics are known. For instance, Patent Literature 1 discloses a separator wherein a microporous material made of a polyolefin resin is provided on the surface of a nonwoven fabric made of glass fibers. In the technology of Patent Literature 1, however, the microporous material made of a polyolefin resin is provided on the surface of a nonwoven fabric, and hence internal resistance increases through plugging of the voids of the nonwoven fabric, by the polyolefin resin, during application of surface pressure. It is thus difficult to suppress fluctuation in battery resistance. In the configuration of the present invention, by contrast, the first separator and the second separator are disposed inside the electrode assembly, in a state where the first and the second separators are not in contact with each other in a stacking direction of the electrode assembly, and hence the first separator and the second separator do not interfere with each other (do not adversely affect each other). Accordingly, fluctuation in battery resistance accompanying changes in surface pressure can be suppressed to a greater degree.

In a preferred aspect of the battery disclosed herein, a relationship $$-0.8\, Y/X \leq (S1/S2) - 1.2\, Y/X \qquad \text{[Math. 1]}$$

is satisfied by a surface area ratio (S1/S2), where S1 denotes the surface area of a region at which the first separator and the positive electrode oppose each other, and S2 denotes the surface area of a region at which the second separator and the positive electrode oppose each other. Fluctuation in battery resistance accompanying changes in surface pressure can thus be suppressed to a greater degree when the value of the surface area ratio (S1/S2) lies within the above range.

In a preferred aspect of the battery disclosed herein, the electrode assembly is a stacked electrode assembly formed by (resulting from) repeatedly stacking the positive electrode, the first separator, the negative electrode and the second separator in this order. In the present invention, fluctuation in battery resistance accompanying changes in surface pressure can thus be suppressed to a greater degree in a stacked electrode assembly formed by (resulting from) repeatedly stacking the positive electrode, the first separator, the negative electrode and the second separator in this order, as described above.

In a preferred aspect of the battery disclosed herein, the electrode assembly is a wound electrode assembly formed by (resulting from) stacking the positive electrode, the first separator, the negative electrode and the second separator in this order, and winding the resulting stack. In the present invention, fluctuation in battery resistance accompanying changes in surface pressure can thus be suppressed to a greater degree in a wound electrode assembly formed by (resulting from) stacking the positive electrode, the first separator, the negative electrode and the second separator in this order, and winding the resulting stack.

DESCRIPTION OF EMBODIMENTS

A battery according to an embodiment of the present invention will be explained next with reference to accompanying drawings. Members and sites that elicit identical effects will be denoted by identical reference symbols, as appropriate. The diagrams are all drawn schematically, and do not necessarily reflect real features. The drawings illustrate only examples which, unless specifically stated, do not limit in any way the present invention. Embodiments of the present invention will be explained based on examples of an instance where the present invention is used in a lithium ion secondary battery, but the battery to which the present invention can be applied is not meant to be limited thereto.

Figure 1:
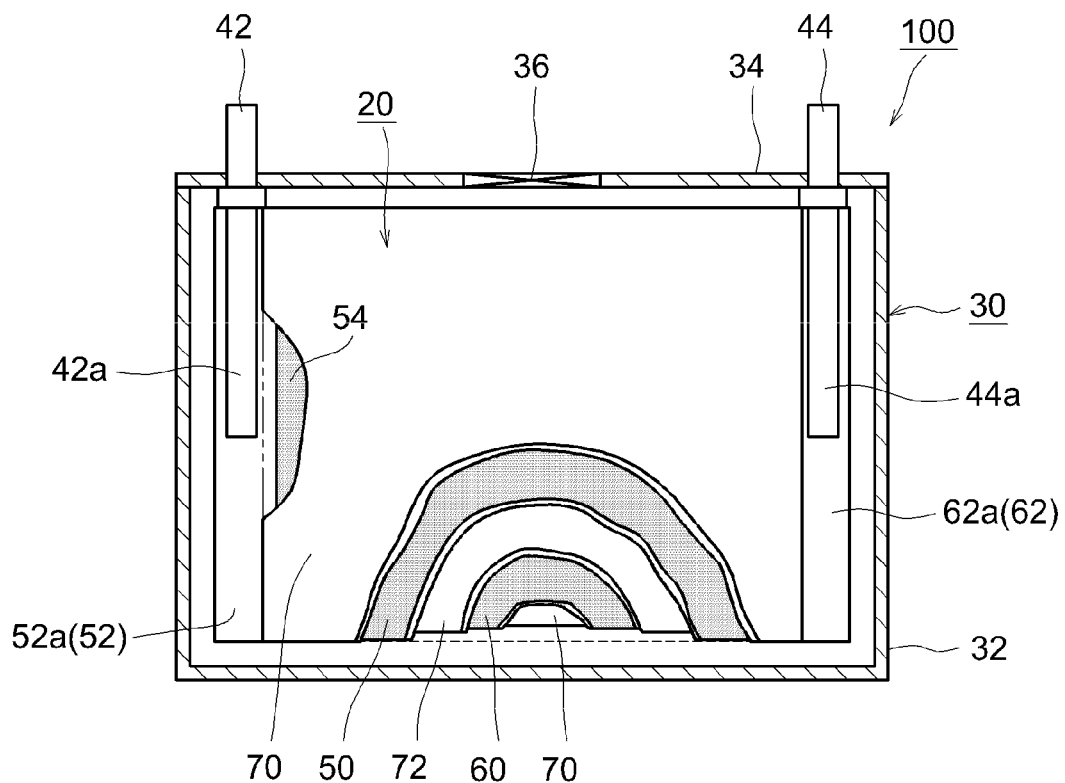
FIG. 1 is a diagram illustrating an example of a structure of a lithium ion secondary battery according to an embodiment.
Figure 2:
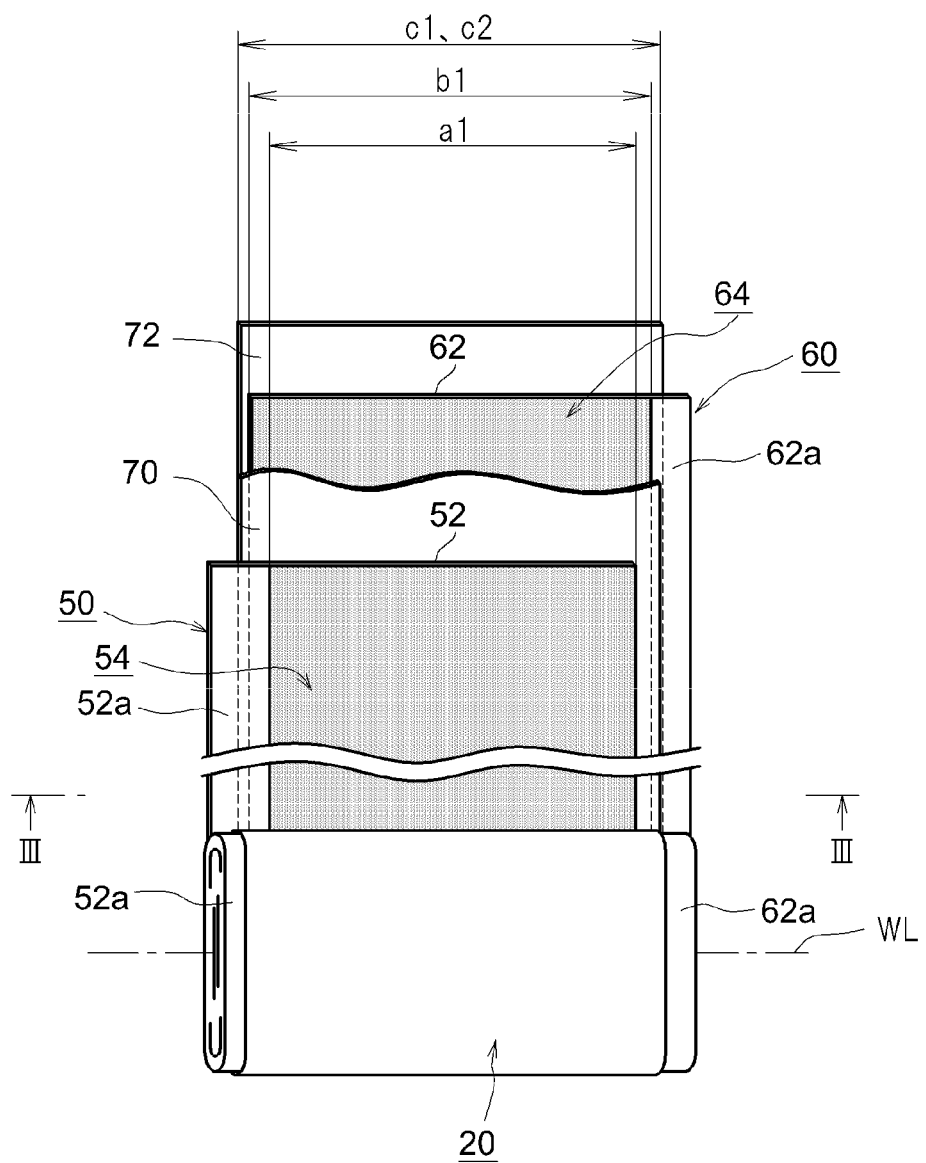
FIG. 2 is a diagram illustrating a wound electrode assembly according to an embodiment.
Figure 3:
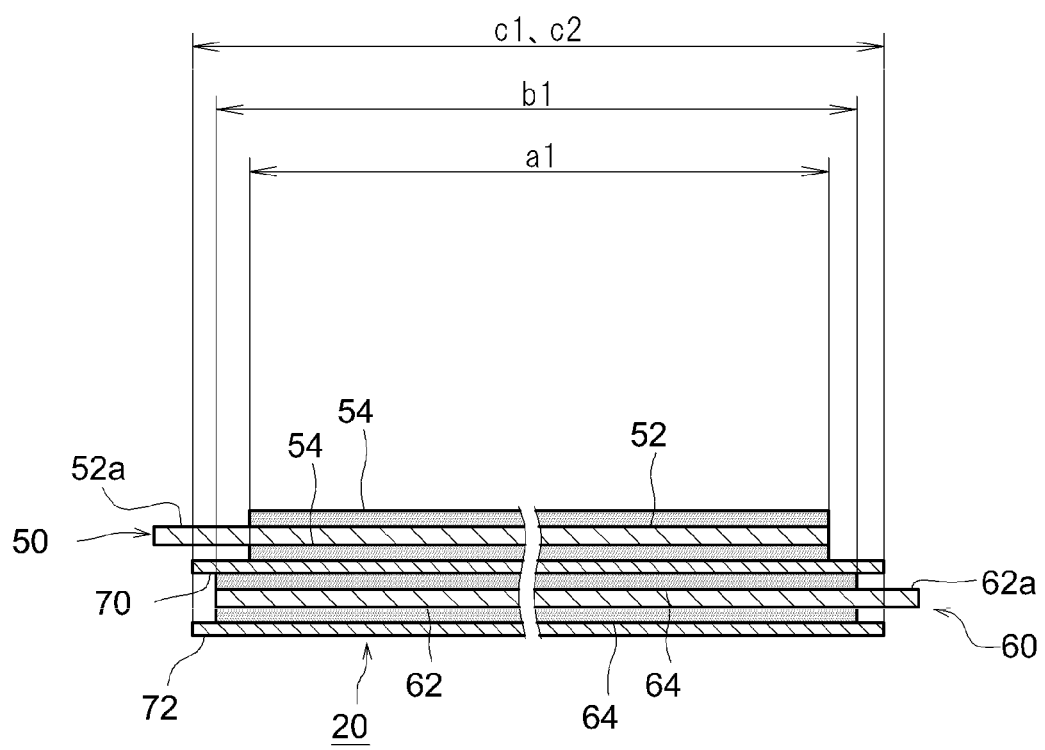
FIG. 3 is a cross-sectional diagram illustrating a cross-section of FIG. 2.

FIG. 1 illustrates a lithium ion secondary battery 100 according to an embodiment of the present invention. As illustrated in FIG. 1, the lithium ion secondary battery 100 includes a wound electrode assembly 20 and a battery case 30. FIG. 2 is a diagram illustrating the wound electrode assembly 20. FIG. 3 illustrates a cross-section of FIG. 2. In the lithium ion secondary battery 100 according to an embodiment of the present invention, as illustrated in FIG. 1 and FIG. 2, the wound electrode assembly 20 of flat shape is accommodated in the battery case (i.e. outer container) 30, of flat square shape, together with a liquid electrolyte (electrolyte solution) not shown.

The battery case 30 is made up of a case body 32 of box-like shape (i.e. bottomed parallelepiped shape) having an opening at one end (corresponding to the top end of the battery in a state where the latter is used normally), and a sealing plate (lid body) 34 that is formed of a rectangular plate member and that is attached to the opening of the case body 32 to plug the opening thereby. Examples of the material of the battery case 30 include, for instance, aluminum. As illustrated in FIG. 1, a positive electrode terminal 42 and a negative electrode terminal 44 for external connection are formed in the sealing plate 34. A thin-walled safety valve 36 is formed between the terminals 42, 44 of the sealing plate 34 in such a way so as to release the internal pressure of the battery case 30 if the internal pressure rises to or above a predetermined level.

As illustrated in FIG. 2, the wound electrode assembly 20 results from stacking a sheet-like positive electrode (positive electrode sheet) 50, a first separator 70, a sheet-like negative electrode (negative electrode sheet) 60 and a second separator 72, and winding the resulting stack.

The positive electrode sheet 50 includes a band-like positive electrode collector 52 and a positive electrode active material layer 54. For instance, a band-like aluminum foil having a thickness of about 15 micrometer is used as the positive electrode collector 52. An uncoated section 52a is set along one edge of the positive electrode collector 52, on one side in the width direction thereof. In the example illustrated in the figure, the positive electrode active material layer 54 is held on both faces of the positive electrode collector 52, excluding the uncoated section 52a that is set on the positive electrode collector 52. The positive electrode active material layer 54 includes a positive electrode active material, a conductive material and a binder.

A substance used as a positive electrode active material of lithium ion secondary batteries can be used herein as the positive electrode active material. Examples of the positive electrode active material include, for instance, lithium transition metal oxides such as a $LiNiCoMnO_2$ (lithium nickel cobalt manganese complex oxide). For instance, carbon black such as an acetylene black (AB) or a mixture of other powdery carbon materials (graphite or the like) can be used, as a conductive material, in the positive electrode active material. A binder can also be added, for instance polyvinylidene fluoride (PVDF), styrene butadiene rubber (SBR), polytetrafluoroethylene (PTFE), carboxymethyl cellulose (CMC) or the like, in addition to the positive electrode active material and the conductive material. A positive electrode mix (paste) can be prepared by dispersing the foregoing in an appropriate dispersion medium, and kneading the resulting dispersion. The positive electrode active material layer 54 is formed through coating of the positive electrode collector 52 with the positive electrode mix, followed by drying and pressing to a preset thickness.

As illustrated in FIG. 2, the negative electrode sheet 60 includes a band-like negative electrode collector 62 and a negative electrode active material layer 64. For instance, a band-like copper foil having a thickness of about 10 micrometer is used as the negative electrode collector 62. An uncoated section 62a is set along one edge of the negative electrode collector 62, on one side in the width direction thereof. In the example illustrated in the figure, the negative electrode active material layer 64 is held on both faces of the negative electrode collector 62, excluding the uncoated section 62a that is set on the negative electrode collector 62. The negative electrode active material layer 64 includes, for instance, a negative electrode active material, a thickener, a binder and so forth.

As the negative electrode active material there can be used, without particular limitations, one, two or more substances conventionally used in lithium ion secondary batteries. Suitable examples thereof include carbon materials such as graphite carbon. As in the case of the positive electrode, a negative electrode mix (paste) can be prepared by dispersing the negative electrode active material in an appropriate dispersion medium, together with a binder such as PVDF, SBR, PTFE, CMC or the like, and kneading of the resulting dispersion. The negative electrode active material layer 64 is formed through coating of the negative electrode collector 62 with the negative electrode mix, followed by drying and pressing to a preset thickness.

The first separator 70 and the second separator 72 are members that separate the positive electrode sheet 50 and the negative electrode sheet 60, as illustrated in FIG. 2 and FIG. 3. In this example, the first separator 70 and the second separator 72 are configured out of band-like sheet materials of predetermined width and having a plurality of small holes. As illustrated in FIG. 2 and FIG. 3, a width b1 of the negative electrode active material layer 64 is larger than a width a1 of the positive electrode active material layer 54 (b1>a1). Further, widths c1 and c2 of the first separator 70 and the second separator 72 are larger than the width a1 of the positive electrode active material layer 54 and are larger than the width b1 of the negative electrode active material layer 64 (c1, c2>b1>a1). The first separator 70 and the second separator 72 will be explained in detail further on.

In the wound electrode assembly 20, the positive electrode sheet 50 and the negative electrode sheet 60 are stacked on each other, with the first separator 70 or the second separator 72 interposed therebetween, in such a manner that the positive electrode active material layer 54 and the negative electrode active material layer 64 oppose each other. In the wound electrode assembly 20, more specifically, the positive electrode sheet 50, the negative electrode sheet 60, the first separator 70 and the second separator 72 are stacked in the order positive electrode sheet 50, first separator 70, negative electrode sheet 60 and second separator 72. Further, the negative electrode collector 62 and the positive electrode collector 52 are stacked in such a manner that the mutual uncoated sections 52a, 62a protrude respectively out of opposite sides of the wound electrode assembly 20, in the width direction of the latter. The stacked sheet material (for instance, the positive electrode sheet 50) is wound about a winding axis WL that is set in the width direction.

The wound electrode assembly 20 is attached to the electrode terminals 42, 44 that are in turn attached to the battery case 30 (in this example, to a lid body 34). The wound electrode assembly 20 is accommodated in the battery case 30 in a state of being pressed and bent flat in a direction that is perpendicular to the winding axis. The uncoated section 52a of the positive electrode sheet 50 and the uncoated section 62a of the negative electrode sheet 60 in the wound electrode assembly 20 jut out of mutually opposite sides in the width direction of the separators 70, 72. The electrode terminal 42 is fixed to the uncoated section 52a of the positive electrode collector 52, while the other electrode terminal 44 is fixed to the uncoated section 62a of the negative electrode collector 62. The wound electrode assembly 20 is accommodated in a flat internal space of the case body 32. The case body 32 is plugged with the lid body 34 after the wound electrode assembly 20 has been accommodated in the case body 32.

An electrolyte solution identical to nonaqueous electrolyte solutions that are conventionally used in lithium ion secondary batteries can be used herein, without any particular restrictions, as the electrolyte solution (nonaqueous electrolyte solution). The nonaqueous electrolyte solution has typically a composition wherein a supporting salt is incorporated in an appropriate nonaqueous solvent. As the nonaqueous solvent there can be used one two or more types of nonaqueous solvent selected from the group consisting of ethylene carbonate, propylene carbonate, dimethyl carbonate, diethyl carbonate, ethyl methyl carbonate, 1,2-dimethoxyethane, 1,2-diethoxyethane, tetrahydrofuran, 1,3-dioxolane and the like. As the supporting salt there can be used, for instance, a lithium salt such as $LiPF_6$, $LiBF_4$, $LiAsF_6$, $LiCF_3SO_3$, $LiC_4F_9SO_3$, $LiN(CF_3SO_2)_2$ or $LiC(CF_3SO_2)_3$. As an example, the nonaqueous electrolyte solution contains $LiPF_6$ at a concentration of about 1 mol/L in a mixed solvent (for instance, mass ratio 1:1) of ethylene carbonate and diethyl carbonate.

The first separator 70 and the second separator 72 of the lithium ion secondary battery 100 according to the embodiment of the present invention will be explained in detail next.

Assembled batteries that are installed in vehicles such as automobiles are constructed in a state where multiple batteries are arrayed and restrained, under the premise that the assembled battery will be used in a limited installation space and while being subjected to vibration. During restraint, a substantial surface pressure (restraining load) is applied onto each of the batteries that make up the assembled battery. Findings by the inventors have revealed that expansion and contraction of electrode plates, which occur due to, for instance, changes in temperature and changes in the charging state of the battery during actual use, may result in significant fluctuation of the surface pressure (restraining load) that acts on the batteries. Such fluctuation may in turn give rise to changes in the resistance of the battery. Fluctuation in battery resistance can moreover result in reduced battery performance.

Figure 11:
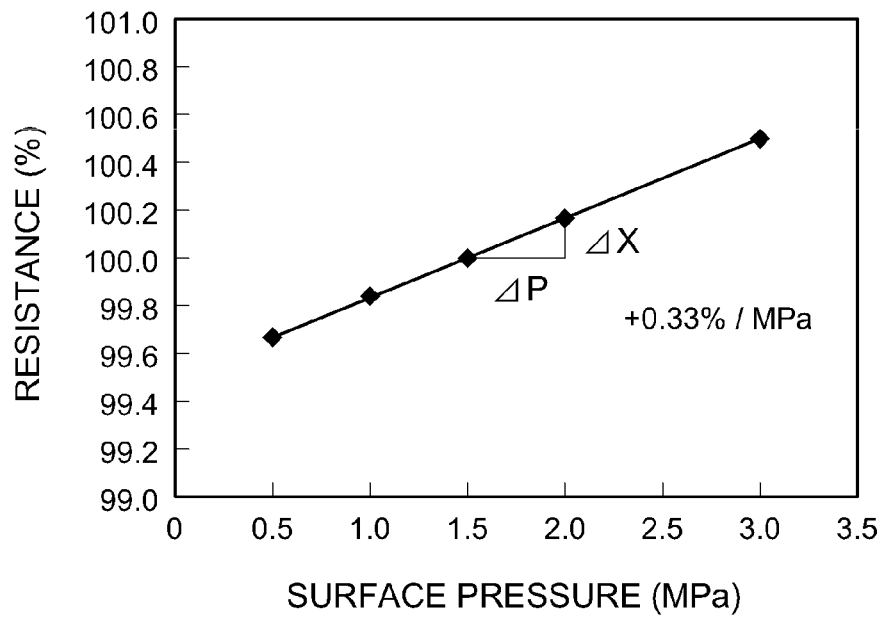
FIG. 11 is a graph illustrating a relationship between surface pressure and resistance (Sample 1)
Figure 12:
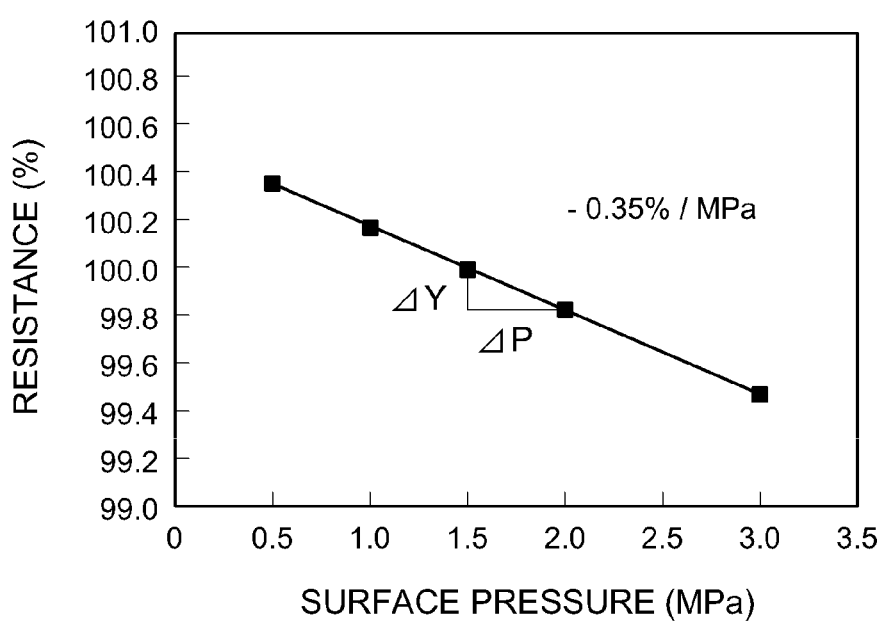
FIG. 12 is a graph illustrating a relationship between surface pressure and resistance (Sample 2)

Through experimentation, the inventors found that the separators are the cause of fluctuation in battery resistance accompanying changes in surface pressure (surface pressure dependence). Specifically, the inventors prepared a plurality of batteries using various dissimilar separators, and measured the IV resistance of each battery while modifying the surface pressure (restraining load) of the battery. FIG. 11 and FIG. 12 illustrate the results of measurements of IV resistance in batteries, among the foregoing, that utilize a separator formed from a polyolefin resin and a battery that utilizes a separator formed from a nonwoven fabric. FIG. 11 is a graph illustrating the relationship between surface pressure and IV resistance when a polyolefin resin separator is used. FIG. 12 is a graph illustrating the relationship between surface pressure and IV resistance when a nonwoven fabric separator is used.

As illustrated in FIG. 11, IV resistance tended to increase with increasing surface pressure in the battery that utilized a polyolefin resin separator. On the other hand, IV resistance tended to decrease with increasing surface pressure in the battery that utilized a nonwoven fabric separator, as illustrated in FIG. 12. This means that the surface pressure dependence of IV resistance exhibits a positive-negative reversal trend between a polyolefin resin separator and a nonwoven fabric separator. The inventors perfected the present invention based on the idea whereby a battery that exhibits less fluctuation in battery resistance accompanying changes in surface pressure, as compared with conventional batteries, can be obtained by using two types of separator that exhibit such a positive-negative reversal trend of the surface pressure dependence of IV resistance, and by exploiting interactions between the respective characteristics of the separators.

The lithium ion secondary battery 100 proposed herein includes the wound electrode assembly 20 formed by stacking the positive electrode 50, the first separator 70, the negative electrode 60 and the second separator 72, in this order, and winding the resulting stack, as illustrated in FIG. 1 to FIG. 3. The surface pressure dependence of IV resistance in the first separator 70 and the second separator 72 exhibit a mutual positive-negative reversal trend.

Figure 4:
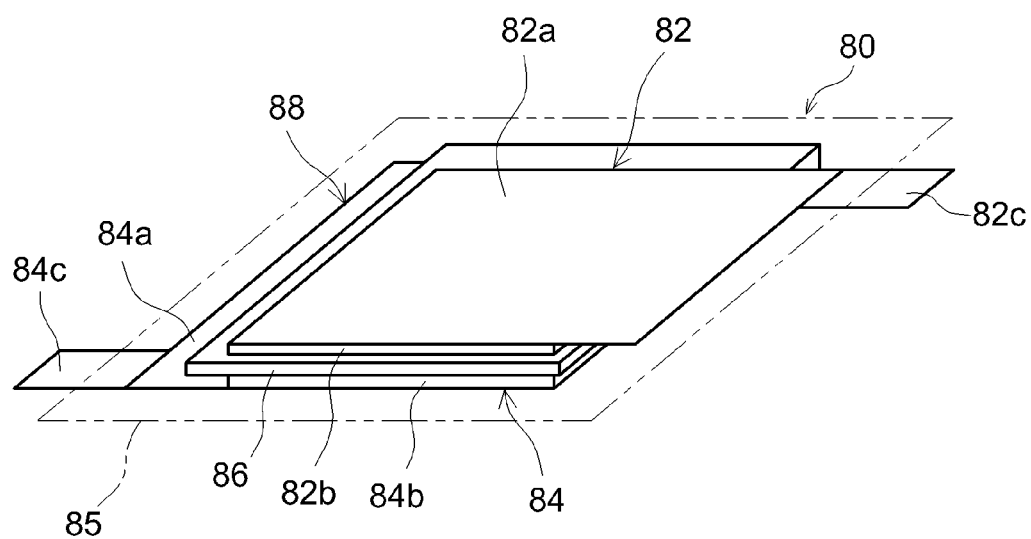
FIG. 4 is a perspective-view diagram illustrating a laminate cell.

The surface pressure dependence of IV resistance can be worked out using a laminate cell 80 illustrated in FIG. 4. Herein, FIG. 4 illustrates a configuration example of the laminate cell 80 for obtaining the surface pressure dependence of IV resistance. In order to obtain such a surface pressure dependence of IV resistance, for instance, an electrode assembly 88 is prepared that includes a separator 86 to be evaluated, a positive electrode 82 and a negative electrode 84, as illustrated in FIG. 4. The first separator 70 and the second separator 72 are respectively used herein as the separator 86. A positive electrode in which a positive electrode active material layer 82b is held on one face of a positive electrode collector 82a is used herein as the positive electrode 82. Materials identical to those of the positive electrode collector 52 and the positive electrode active material layer 54 used in the positive electrode sheet 50 are used herein in the positive electrode collector 82a and the positive electrode active material layer 82b. A positive electrode terminal 82c is attached to the positive electrode collector 82a. A negative electrode in which a negative electrode active material layer 84b is held on one face of a negative electrode collector is used as the negative electrode 84. Materials identical to those of the negative electrode collector 62 and the negative electrode active material layer 64 that are used in the negative electrode sheet 60 are utilized herein in the negative electrode collector 84a and the negative electrode active material layer 84b. A negative electrode terminal 84c is attached to the negative electrode collector 84a.

In the laminate cell 80, as illustrated in FIG. 4, the positive electrode 82 and the negative electrode 84 are disposed opposing each other, with the separator 86 to be evaluated interposed therebetween, within a laminate bag 85, and are accommodated while immersed in an electrolyte solution. A given surface pressure (load) is applied on the stacking direction of the electrode assembly 88 of the laminate cell 80 (direction of the stack of the positive electrode 82, the separator 86 and the negative electrode 84). The laminate cell 80 is charged and discharged, over 10 seconds, at a predetermined current value (for instance, 30 C), at each surface pressure, in a predetermined range within which the surface pressure is modified; thereupon, IV resistance is calculated on the basis of the difference between the voltage value before charge and discharge (initial voltage value) and a voltage value at the point in time after 10 seconds have elapsed since the initial voltage value. The surface pressure dependence of IV resistance can be grasped from the graph illustrating a correlation between IV resistance and surface pressure.

FIG. 11 illustrates the change in IV resistance in a case where surface pressure is modified within a range of 0.5 to 3.0 MPa, using the first separator 70. The surface pressure herein denotes a relative value with respect to 100% of the IV resistance for a surface pressure of 1.5 MPa. In this case, the surface pressure dependence of IV resistance when using the first separator 70 (hereafter, resistance increase rate X) can be evaluated by knowing the slope of the graph that denotes the correlation between surface pressure and IV resistance. Specifically, X can be evaluated using Expression (1) below. In this example, X is set to +0.33%/MPa.

Resistance increase rate X(%/MPa)=Delta X/Delta P  (1)

Delta $P(\Delta P)$:  [Math. 2]

change amount (MPa) of surface pressure applied in the stacking direction of the electrode assembly Delta $X(\Delta X)$:  [Math. 3]

resistance increment (%) upon application of the surface pressure change amount Delta P FIG. 12 illustrates the change in IV resistance in a case where surface pressure is modified within a range of 0.5 to 3.0 MPa, using the second separator 72. The surface pressure herein denotes a relative value with respect to 100% of the IV resistance for a surface pressure of 1.5 MPa. In this case, the surface pressure dependence of IV resistance when using the second separator 72 (hereafter, resistance increase rate Y) can be evaluated by knowing the slope of the graph that denotes the correlation between surface pressure and IV resistance. Specifically, Y can be evaluated using Expression (2) below. In this example, Y is set to −0.35%/MPa.

Resistance increase rate Y(%/MPa)=Delta Y/Delta P  (2)

Figure 13:
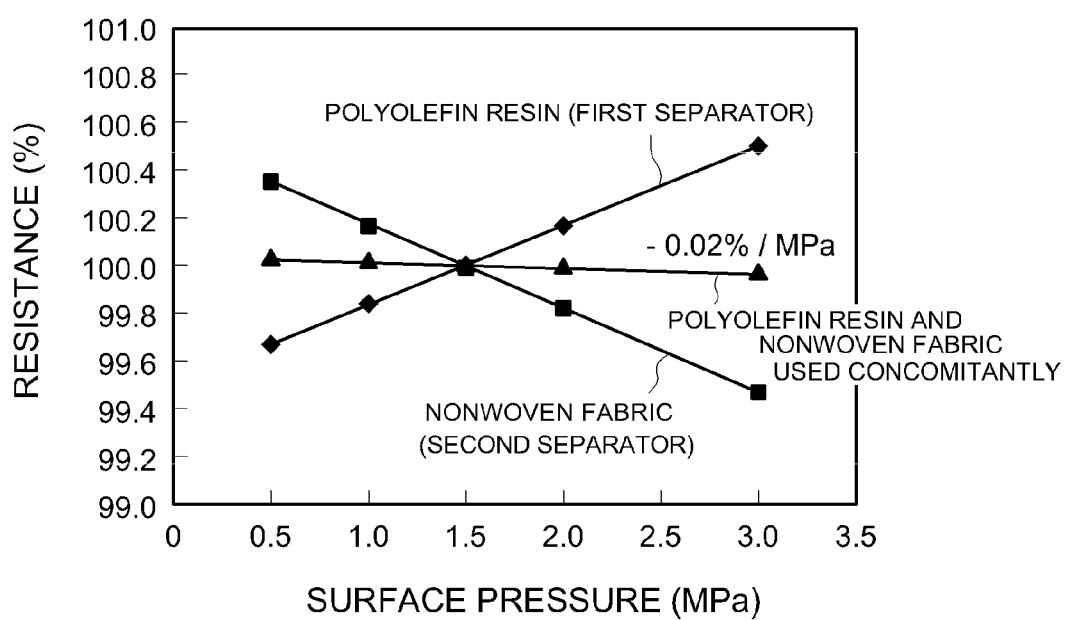
FIG. 13 is a graph illustrating a relationship between surface pressure and resistance.

Delta $P(\Delta P)$:  [Math. 4]

change amount (MPa) of surface pressure applied in the stacking direction of the electrode assembly Delta $Y(\Delta Y)$:  [Math. 5]

resistance increment (%) upon application of the surface pressure change amount Delta P In the lithium ion secondary battery 100 disclosed herein, the resistance increase rate X that is based on the above measurement of the first separator 70 as evaluated using Expression (1) is prescribed to be X>0 (positive value). The resistance increase rate Y that is based on the above measurement of the second separator 72 as evaluated using Expression (2) is prescribed to be Y<0 (negative value). That is, the first separator 70 and the second separator 72 are set so that the resistance increase rates X, Y based on the above measurements exhibit the above positive-negative reversal trend. In such a configuration, fluctuation in battery resistance does not occur readily even upon changes in surface pressure, thanks to the concomitant use of the first separator 70 and the second separator 72 the resistance increase rates X, Y whereof exhibit a positive-negative reversal trend. As a result, a high-performance lithium ion secondary battery 100 can be constructed in which various problems that accompany the above fluctuation in battery resistance are resolved. For instance, FIG. 13 is a graph of a simulation of a relationship between surface pressure and IV resistance when using concomitantly the first separator 70 having a resistance increase rate X of +0.33%/MPa and the second separator 72 having a resistance increase rate Y of −0.35%/MPa. As illustrated in FIG. 13, the surface pressure dependence of IV resistance (resistance increase rate) can be reduced down to −0.02%/MPa by using concomitantly the first separator 70 and the second separator 72 having mutually different resistance increase rates X, Y.

Studies by the inventors have revealed, in below-described test examples, that the resistance fluctuation suppression effect brought out through the concomitant use of the first separator 70 and second separator 72 having mutually different resistance increase rates X, Y cannot be elicited, to a similar degree, when using a separator having a two-layer structure in which the first separator 70 and the second separator 72 are bonded to each other. That is, a lithium ion secondary battery 100 can be constructed that affords a yet better resistance fluctuation suppression effect if the first separator 70 and the second separator 72 are disposed within the electrode assembly 20 in a state where the first separator 70 and second separator 72 are not in contact with each other in the stacking direction of the electrode assembly 20.

It suffices that the resistance increase rate X of the first separator 70 disclosed herein, as evaluated based on Expression (1), be set so that X>0 (positive value). For instance, a polyolefin resin such as polyethylene (PE) or polypropylene (PP) can be suitably used as the material of the first separator 70. The structure of the first separator 70 formed from such a polyolefin resin may be a single-layer structure or a multilayer structure. For instance, the first separator 70 may be configured in the form of a three-layer structure of a PP layer, a PE layer stacked on the PP layer, and a PP layer stacked on the PE layer. The layer count of the first separator 70 having a multilayer structure is not limited to three, and may be two, or four or more.

For instance, the first separator 70 may be made up of PE-based resin. A homopolymer of ethylene is preferably used as the PE-based resin. The PE-based resin may be a resin containing 50 mass % or more of repeating units derived from ethylene, i.e. a copolymer resulting from polymerizing an α-olefin that is copolymerizable with ethylene, or a copolymer resulting from polymerizing at least one type of monomer copolymerizable with ethylene. Examples of the α-olefin include propylene and the like. Examples of the other monomer include, for instance, conjugated dienes (for instance, butadiene), acrylic acid and the like. For instance, a polyolefin ordinarily referred to as high-density polyethylene or chain-like (linear) low-density polyethylene can be used as the PE. Alternatively, various kinds of medium-density and low-density branched polyethylene may be used herein. The first separator 70 can contain various additives such as plasticizers, antioxidants and the like, as needed.

The thickness of the first separator 70 disclosed herein ranges preferably from about 10 micrometer to 30 micrometer and more preferably from about 10 micrometer to 25 micrometer. The above-described effect can be elicited yet more pronouncedly when the thickness of the first separator 70 lies within the above ranges. The ion conductivity of the first separator 70 may drop if the thickness of the first separator 70 is excessively large. On the other hand, the occurrence of film breakage may pose a concern if the thickness of the first separator 70 is excessively small. The thickness of the first separator 70 can be worked out through analysis of images captured by SEM.

The porosity of the first separator 70 ranges preferably from about 20% to 60%, and more preferably, for instance, from about 30% to 50%. The above-described effect can be elicited yet more pronouncedly, while effectively bringing out the shutdown function of the first separator 70, when the porosity of the latter lies within the above ranges. If the porosity of the first separator 70 is excessively large, a concern arises in that the shutdown function of the first separator 70 might not work effectively, and film breakage is likelier to occur on account of insufficient film strength. On the other hand, the amount of electrolyte solution that can be held in the first separator 70 may decrease, and ion conductivity may drop, if the porosity of the first separator 70 is excessively small.

The Gurley value (airflow resistance) of the first separator 70 disclosed herein ranges appropriately from about 300 (sec/100 cm$^3$) to 900 (sec/100 cm$^3$), preferably from 400 (sec/100 cm$^3$) to 800 (sec/100 cm$^3$), and more preferably from 500 (sec/100 cm$^3$) to 700 (sec/100 cm$^3$). The above-described effect can be elicited yet more pronouncedly, while effectively bringing out the shutdown function of the first separator 70, when the Gurley value of the latter lies within the above ranges. The Gurley value of the separators in the present description is measured in accordance with the standard "Testing methods for woven and knitted fabrics" in JIS L 1096:2010.

It suffices that the resistance increase rate Y of the second separator 72 disclosed herein, as evaluated based on Expression (2), be set so that Y<0 (negative value). For instance, a nonwoven fabric can be suitably used as the second separator 72. Examples of the fibers that make up the nonwoven fabric include, for instance, glass, cellulose, polyethylene terephthalate (PET), polyamide, polyimide, polyamide-imide, polyacrylonitrile, wholly aromatic polyester and the like. Among the foregoing, the nonwoven fabric preferably contains glass fibers; particularly preferably, a nonwoven fabric is used that is made up substantially of glass fibers. The fibers that make up the nonwoven fabric may be either short fibers or long fibers. The fiber diameter of the nonwoven fabric ranges suitably from about 5 micrometer to 30 micrometer, and preferably from 10 micrometer to 20 micrometer. The above-described effect can be elicited yet more pronouncedly, while effectively bringing out the shutdown function of the second separator 72, when the fiber diameter of the nonwoven fabric lies within the above ranges. The fibers of the nonwoven fabric can contain various additives such as plasticizers, antioxidants and the like, as needed.

The thickness of the second separator 72 disclosed herein ranges preferably from about 10 micrometer to 30 micrometer, and more preferably from about 10 micrometer to 25 micrometer. The above-described effect can be elicited yet more pronouncedly when the thickness of the second separator 72 lies within the above ranges. The ion conductivity of the second separator 72 may drop if the thickness thereof is excessively large. On the other hand, the occurrence of film breakage may be a concern if the thickness of the second separator 72 is excessively small. The thickness of the second separator 72 can be worked out through analysis of images captured by SEM.

The porosity of the second separator 72 ranges preferably from about 50% to 90%, and more preferably, for instance, from about 60% to 85%. The above-described effect can be elicited yet more pronouncedly, while effectively bringing out the shutdown function of the second separator 72, when the porosity of the latter lies within the above ranges. If the porosity of the second separator 72 is excessively large, a concern arises in that film breakage is likelier to occur on account of insufficient film strength. On the other hand, the amount of electrolyte solution that can be held in the second separator 72 may decrease, and ion conductivity may drop, if the porosity of the second separator 72 is excessively small.

The Gurley value (airflow resistance) of the second separator 72 disclosed herein ranges appropriately from about 3 (sec/100 cm$^3$) to 20 (sec/100 cm$^3$), preferably from 5 (sec/100 cm$^3$) to 15 (sec/100 cm$^3$), and more preferably from 6 (sec/100 cm$^3$) to 10 (sec/100 cm$^3$). The above-described effect can be elicited yet more pronouncedly if the Gurley value of the second separator 72 lies within the above ranges.

A layer of insulating particles may be formed on the surface of the first separator 70 and the second separator 72. The insulating particles may be configured out of an insulating inorganic filler (for instance, a filler such as a metal oxide or metal hydroxide), or insulating resin particles (for example, particles of polyethylene or polypropylene). For instance, a heat-resistant porous layer that contains an inorganic filler may be formed on the face, from among the rear faces of the first separator 70 and the second separator 72, that opposes the negative electrode active material layer. Preferably, the inorganic filler is heat-resistant and electrochemically stable within the specified range of the battery. Suitable examples include, for instance, inorganic metal compounds such as alumina ($Al_2O_3$), alumina hydrate (for instance, boehmite ($Al_2O_3$—$H_2O$)), magnesium hydroxide ($Mg(OH)_2$), magnesium carbonate ($MgCO_3$) and the like. These inorganic metal compound materials can be used as one single type, or concomitantly as two or more types.

Figure 5:
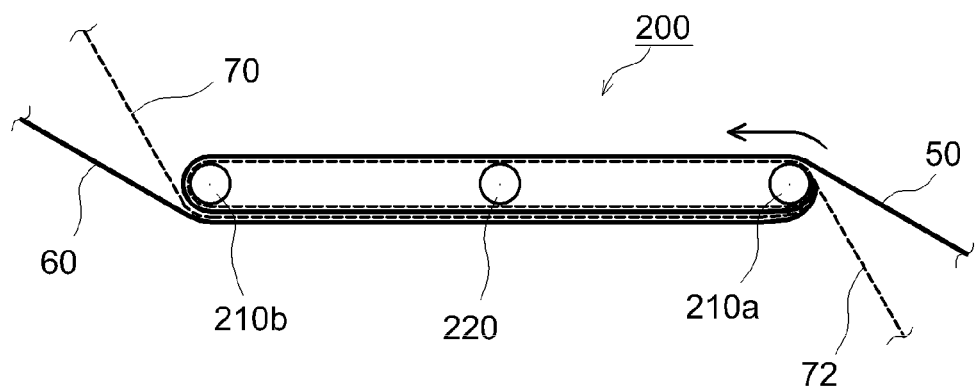
FIG. 5 is a diagram illustrating schematically a winding device according to an embodiment.

The wound electrode assembly 20 including the first separator 70 and the second separator 72 may be produced using the winding device 200 illustrated in FIG. 5. The winding device 200 includes a pair of rollers 210a, 210b and a core 220. The pair of rollers 210a, 210b is disposed so as to flank the core 220 symmetrically. In the example illustrated in FIG. 5, the positive electrode sheet 50 and the second separator 72 are supplied to the roller 210a, and the negative electrode sheet 60 and the first separator 70 are supplied to the roller 210b. In this state, the rollers 210a, 210b are caused to rotate in one direction about respective winding axes. The wound electrode assembly 20 can be constructed thereby by stacking the positive electrode sheet 50, the first separator 70, the negative electrode sheet 60 and the second separator 72, in this order, and winding the resulting stack.

Figure 6:
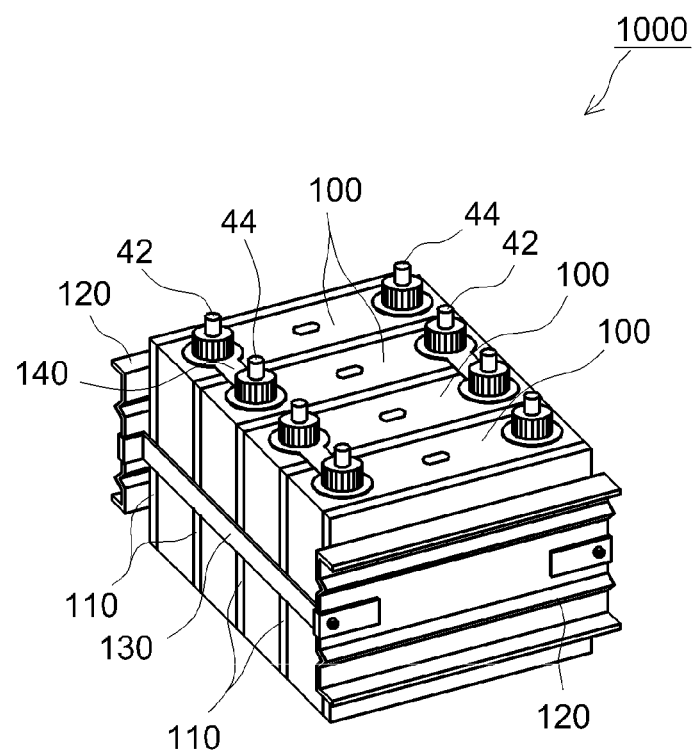
FIG. 6 is a perspective-view diagram illustrating an assembled battery according to an embodiment.

An explanation follows next on a configuration example of an assembled battery that is obtained by providing a plurality of unit cells, each of which is the lithium ion secondary battery 100 having such a configuration. In this assembled battery 1000, as illustrated in FIG. 6, a plurality (four in the figure, for instance 10 or more, preferably about 10 to 30, and for instance 20) lithium ion secondary batteries (unit cells) 100 are arrayed, in a direction (stacking direction) such that the wide surfaces of the battery cases 30 oppose each other, the batteries being reversed with respect to each other so that respective positive electrode terminals 42 and negative electrode terminals 44 are lined up alternately. Cooling plates 110 of a predetermined shape are sandwiched between the unit cells 100 thus arrayed. The cooling plates function as heat dissipation members for efficiently dumping the heat that is generated in the unit cells 100 when in use. The cooling plates have a shape that enables a cooling fluid (typically, air) to be introduced between the unit cells 100 (for instance, a shape wherein a plurality of parallel grooves extends perpendicularly from one side of a rectangular cooling plate to the opposing side of the plate). Suitable herein are cooling plates made of a metal having high good thermal conductivity, or made of a lightweight and hard synthetic resin such as polypropylene.

End plates (restraining plates) 120 of a pair thereof are disposed at both ends of the set of unit cells 100 and cooling plates 110 thus arrayed. The unit cells 100 and cooling plates 110 thus arrayed are restrained by a restraining band 130 for tightening that is attached so as to span across both ends plates 120, and so as to apply a prescribed restraining load (surface pressure: 0.5 MPa to 3 MPa, preferably 1 MPa to 2.5 MPa). One positive electrode terminal 42 and another negative electrode terminal 44 of adjacent unit cells 100 are electrically connected to each other by way of a respective connection member (bus bar) 140.

As illustrated in FIG. 1 to FIG. 3, each of the unit cells 100 of the assembled battery 1000 according to the present embodiment uses concomitantly the first separator 70 and the second separator 72 having mutually different resistance increase rates X, Y. Accordingly, fluctuation in battery resistance does not occur readily in the unit cells 100, even upon changes in the restraining load (surface pressure). A high-performance assembled battery 1000 can therefore be constructed that allows avoiding various problems derived from fluctuation in battery resistance in any of the unit cells 100 (for instance, problems of reduced regenerative current, caused by increased battery resistance, and that result in poorer fuel consumption, or problems of greater charging current, derived from reduced battery resistance, and that result in overcharging).

The lithium ion secondary battery 100 and assembled battery 1000 according to an embodiment of the present invention have been explained above, but the present invention is not limited to the above embodiments.

Figure 7:
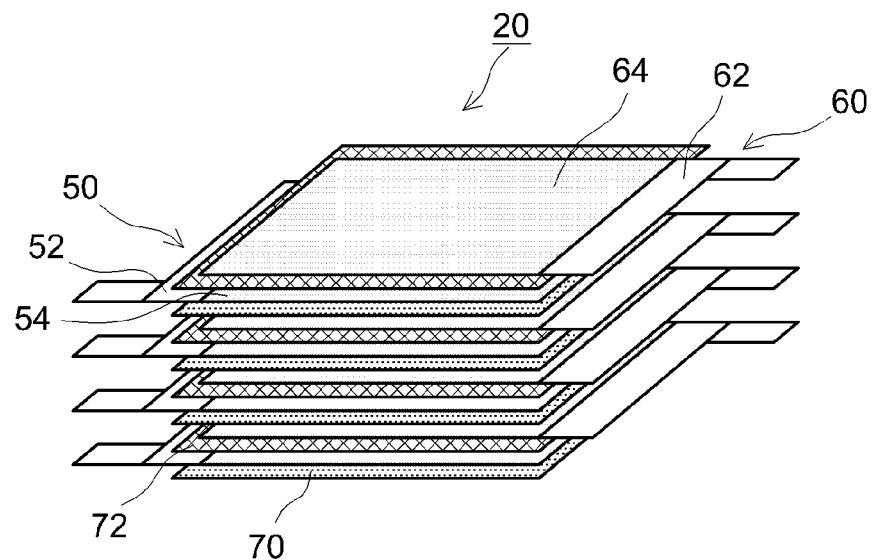
FIG. 7 is a perspective-view diagram illustrating a stacked electrode assembly according to another embodiment.
Figure 8:
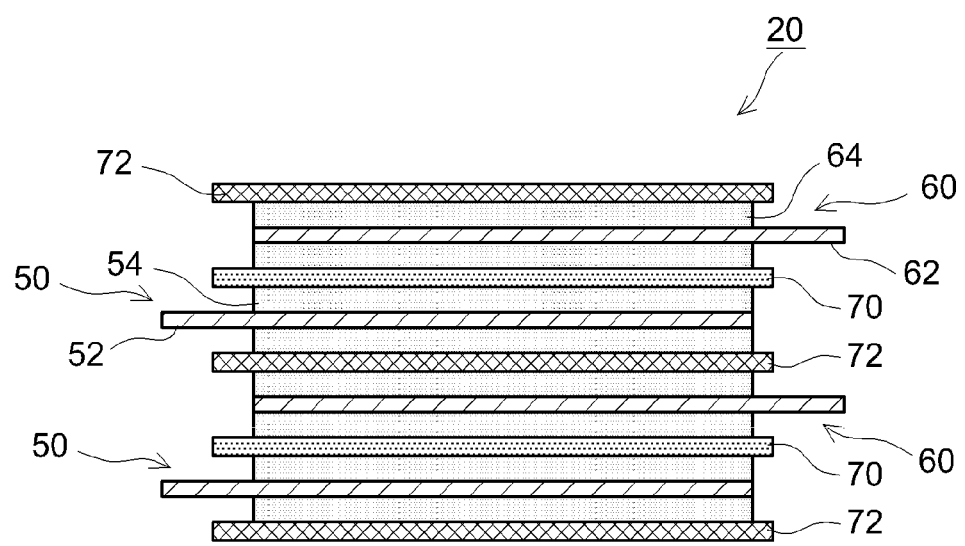
FIG. 8 is a cross-sectional diagram illustrating a stacked electrode assembly according to another embodiment.

Suitable targets for application of the technology disclosed herein are not limited to the above-described wound-type electrode assemblies. For instance, a stacked electrode assembly 20 is also possible in which the positive electrode 50, the first separator 70, the negative electrode 60 and the second separator 72 are repeatedly stacked in this order. FIG. 7 and FIG. 8 illustrate schematically such a stacked electrode assembly 20. In the examples illustrated in the figures, the positive electrode collector 52 and the negative electrode collector 62 are rectangular sheet materials. The positive electrode collector 52 and the negative electrode collector 62 are alternately stacked in such a manner that the longitudinal directions thereof match each other and in such a manner that the positive electrode active material layer 54 and the negative electrode active material layer 64 are alternately stacked opposing each other with the separators 70, 72 interposed therebetween. In this stacked electrode assembly 20, the first separator 70 and the second separator 72 are alternately disposed in the stacking direction of the electrode assembly 20. The above-described effect can be achieved thus by suitably prescribing the resistance increase rates X, Y of the first separator 70 and the second separator 72 to be different from each other, also in a case where the positive electrode 50, the first separator 70, the negative electrode 60 and the second separator 72 are repeatedly stacked in this order. The number of stacked separators is not limited to the eight separators illustrated in the figure, and may be a larger number (for instance 10 to 200).

Figure 9:
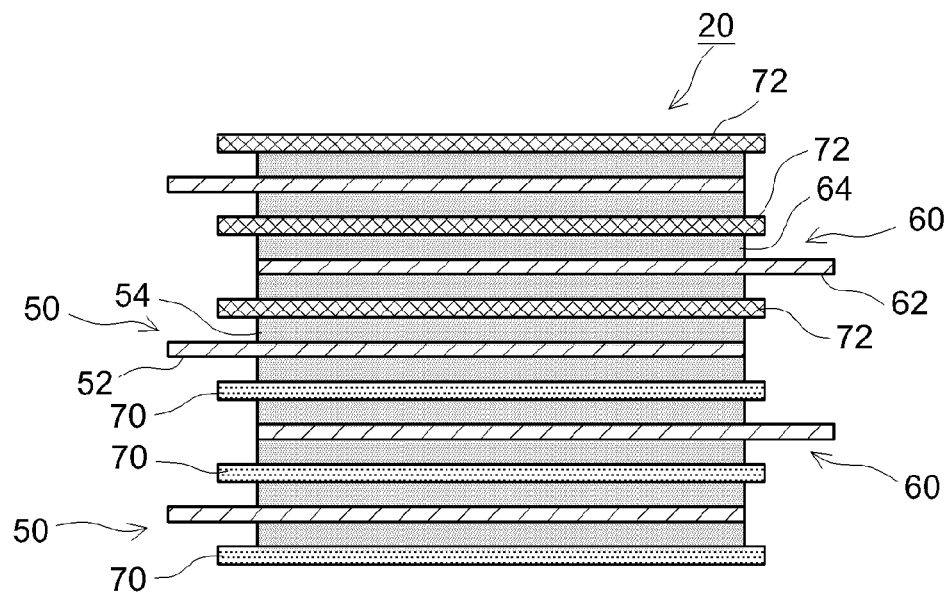
FIG. 9 is a cross-sectional diagram illustrating a stacked electrode assembly according to another embodiment.

In above-described embodiment, the first separator 70 and the second separator 72 are alternately disposed in the stacking direction of the electrode assembly 20, but the stacking order of the first separator 70 and the second separator 72 is not limited thereto; for instance, as illustrated in FIG. 9, a plurality (three in the figure) of first separators 70 (and second separators 72) may be continuously disposed in the stacking direction of the electrode assembly 20. The effect of suppressing resistance fluctuation can be achieved thus by suitably prescribing different resistance increase rates X, Y of the first separators 70 and the second separators 72, also in a case where a plurality of first separators 70 (second separators 72) is continuously disposed in the stacking direction of the electrode assembly 20.

Figure 10:
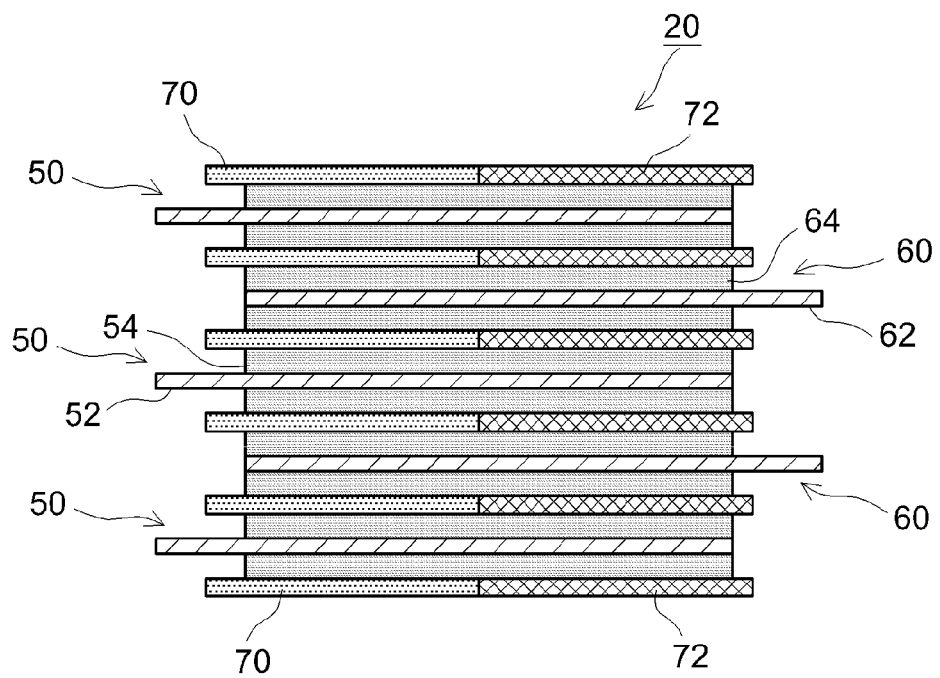
FIG. 10 is a cross-sectional diagram illustrating a stacked electrode assembly according to another embodiment.

In the above-described embodiment, the first separators 70 and the second separators 72 are disposed at different layers in the stacking direction of the electrode assembly 20, but stacking is not limited to this configuration, and the first separators 70 and the second separators 72 may be disposed at identical layers. As illustrated in FIG. 10, for instance, the first separators 70 and the second separators 72 may be disposed adjacent to each other in the width direction, which is perpendicular to the stacking direction of the electrode assembly 20. In the example illustrated in the figure, each first separator 70 is disposed on the side on which there is positioned the uncoated section 52a of the positive electrode collector 52, and each second separator 72 is disposed on the side on which there is positioned the uncoated section 62a of the negative electrode collector 62, in the width direction of the electrode assembly 20. Thus, the effect of suppressing resistance fluctuation can be achieved by suitably prescribing different resistance increase rates X, Y of the first separators 70 and the second separators 72, also in a case where the first separators 70 and the second separators 72 are disposed adjacent to each other in the width direction of the electrode assembly 20.

The lithium ion secondary battery 100 disclosed herein preferably satisfies $$-0.8Y/X \leq (S1/S2) \leq -1.2Y/X, \quad \text{[Math. 6]}$$

more preferably $$-0.9Y/X \leq (S1/S2) \leq -1.12Y/X, \quad \text{[Math. 7]}$$

and particularly preferably, $(S1/S2)=-Y/X$, where S1 denotes the surface area of a region at which the first separators 70 and the positive electrode 50 (in particular, the positive electrode active material layer 54) oppose each other and S2 denotes the surface area of the region at which the second separators 72 and the positive electrode 50 (in particular, the positive electrode active material layer 54) oppose each other. The above X is the resistance increase rate X of the first separators 70 evaluated based on Expression (1), and Y is the resistance increase rate Y of the second separators 72 evaluated based on Expression (2). Preferably, the surface area ratio (S1/S2) satisfies $-Y/X$ (i.e. S1:S2 is 35:33) in a case where there are used the first separator 70 having a resistance increase rate X of +0.33%/MPa and the second separator 72 having a resistance increase rate Y of −0.35%/MPa. In this case, for instance, there may be used 35 first separators 70 and 33 second separators 72, to that total layer count (total number) of 68 separators, in the stacked electrode assembly 20 illustrated in FIG. 9. Resistance fluctuation can be suppressed yet more reliably within such a range of surface area ratio (S1/S2).

TEST EXAMPLES

The inventors evaluated experimentally the characteristics of the separators 70, 72. Cells for evaluation were constructed herein based on the laminate cell (lithium ion secondary battery) 80 illustrated in the perspective-view diagram of FIG. 4. Each cell for evaluation included the positive electrode 82 having the positive electrode active material layer 82b formed on one face of the positive electrode collector 82a, the negative electrode 84 having a negative electrode active material layer 84b formed on one face of the negative electrode collector 84a, and the separator 86 interposed between the positive electrode active material layer 82b and the negative electrode active material layer 84b. The actual thickness of each member is not reflected in FIG. 4.

In the positive electrode 82 there were used a $LiNi_{1/3}Mn_{1/3}Co_{1/3}O_2$ powder as positive electrode active material particles, PVDF as a binder, and acetylene black (AB) as a conductive material, that were included in the positive electrode active material layer 82b. A mix paste prepared through mixing of $LiNi_{1/3}Mn_{1/3}Co_{1/3}O_2$, PVDF and AB, at a mass proportion of $LiNi_{1/3}Mn_{1/3}Co_{1/3}O_2$:PVDF:AB=93:3:4 in NMP as a dispersion solvent, was used herein as the mix for forming the positive electrode active material layer 82b. The mix paste was applied onto an aluminum foil (thickness 15 micrometer), as the positive electrode collector 82a, and the whole was dried and rolled, to form thereby the positive electrode 82.

The negative electrode 84 was prepared using natural graphite powder as negative electrode active material particles, SBR as a binder and CMC as a thickener, included in the negative electrode active material layer 84b. A mix paste prepared through mixing of graphite, SBR, and CMC, at a mass proportion of graphite:SBR:CMC=98:1:1 in water as a dispersion solvent, was used herein as the mix for forming the negative electrode active material layer 84b. The mix paste was applied, in the form of a band, onto a copper foil (thickness 10 micrometer), as the negative electrode collector 84a, and the whole was dried and rolled, to form thereby the negative electrode 84.

The electrolyte solution used herein was obtained by blending ethylene carbonate, diethyl carbonate and ethyl methyl carbonate, at a volume ratio of 3:4:3, and dissolving therein $LiPF_6$, to a concentration of 1.1 mol/L.

The materials of the separators were different in Samples 1 to 3 of cells for evaluation. A porous sheet formed from a single layer of polyethylene (PE) was used in Sample 1. A nonwoven fabric formed from glass fibers was used in Sample 2. A separator having a two-layer structure resulting from bonding a porous film of polyethylene (PE) and a nonwoven fabric formed from glass fibers was used in Sample 3.

Figure 15:
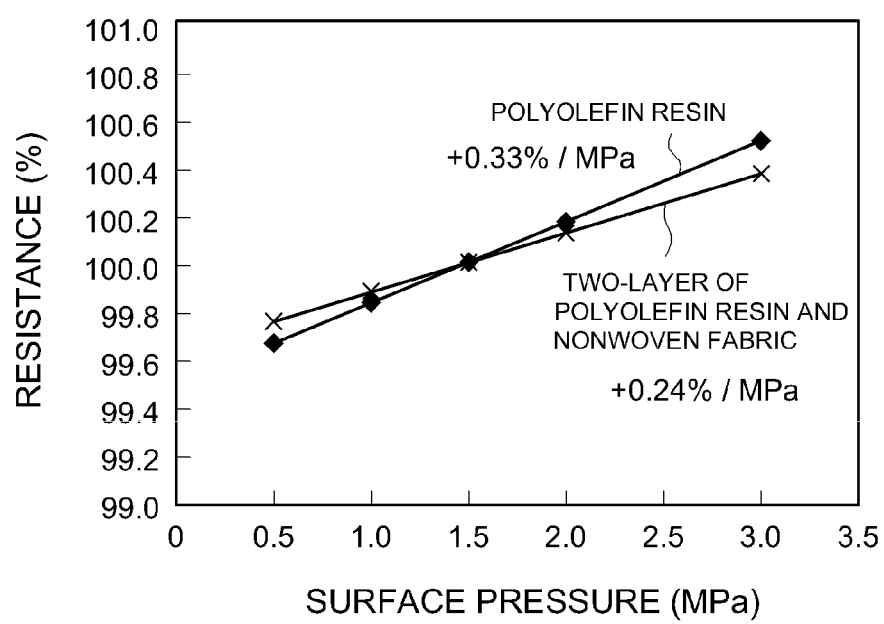
FIG. 15 is a graph illustrating a relationship between surface pressure and resistance (Sample 3).

A given surface pressure (load) was applied onto the cells for evaluation in Samples 1 to 3 thus obtained, in the stacking direction of the positive electrode 82, the separator 86 and the negative electrode 84. The surface pressure was modified to 0.5 MPa, 1.0 MPa, 1.5 MPa, 2.0 MPa and 3.0 MPa, and the IV resistance at was measured at each surface pressure. The IV resistance was worked out herein on the basis of the difference between the voltage value (initial voltage value) before charge and discharge at a current value of 30 C in an environment at 25 degrees Celsius, and a voltage value at a point in time after 10 seconds had elapsed since the initial voltage value. The results are illustrated in FIG. 11, FIG. 12 and FIG. 15. Herein, FIG. 11 is a graph illustrating a relationship between surface pressure and IV resistance in Sample 1, FIG. 12 is a graph illustrating a relationship between surface pressure and IV resistance in Sample 2, and FIG. 15 is a graph illustrating a relationship between surface pressure and IV resistance in Sample 3. Resistance increase rates were calculated from the slopes in the graphs.

As illustrated in FIG. 11, IV resistance exhibited an upward trend with increasing surface pressure, in Sample 1, where a PE porous sheet was used. The resistance increase rate of Sample 1 was +0.33%/MPa. This is deemed to arise from the greater internal resistance brought about by plugging of voids in the PE resin due to the increased surface pressure in the separator of Sample 1. As illustrated in FIG. 12, the IV resistance exhibited a downward trend with increasing surface pressure in Sample 2, in which a nonwoven fabric was used. The resistance increase rate of Sample 2 was −0.35%/MPa. It is deemed that, although voids are not readily plugged in the separator of Sample 2 through an increase in surface pressure, the above result arises from the decrease in IV resistance that is brought about by a reduction in thickness, mainly of the separator (and accordingly, by a reduction in the distance between the positive and the negative electrodes).

Figure 14:
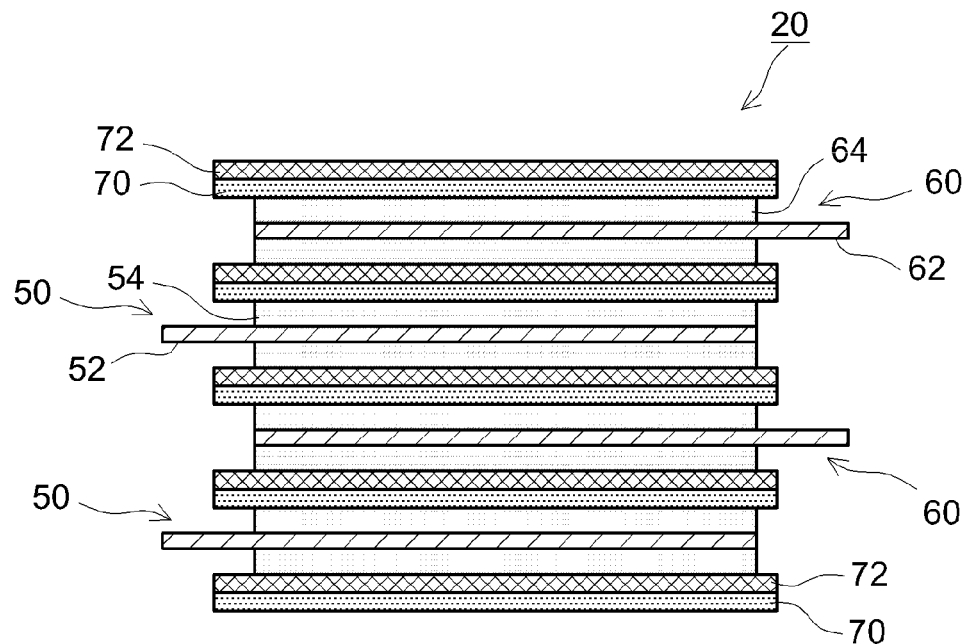
FIG. 14 is a cross-sectional diagram illustrating a stacked electrode assembly.

In Sample 3, where a separator was used that had a two-layer structure being a combination of a PE porous sheet and a nonwoven fabric, the IV resistance exhibited an upward trend with increasing surface pressure, similar to that of Sample 1. The resistance increase rate of Sample 3 was +0.24%/MPa. It is deemed that in the separator of Sample 3, voids in the PE resin are plugged during application of surface pressure, and, furthermore, voids in the nonwoven fabric are plugged by the PE, so that internal resistance increases accordingly. The above results revealed that the effect of suppressing resistance fluctuation cannot be sufficiently achieved in a battery (FIG. 14) that utilizes a separator having a two-layer structure being a combination of the first separator 70 and the second separator 72.

The invention has been explained above on the basis of suitable embodiments, but the features described thus far are not limiting, and needless to say the embodiments may accommodate various modifications. In the above embodiments, for instance, a lithium ion secondary battery has been explained as a typical example of a battery, but the embodiments are not limited to a battery of this form. For instance, the battery may be a battery in which metal ions other than lithium ions (for instance, sodium ions) are used as charge carriers.

A described above, the battery provided according to the technology disclosed herein (typically, a lithium ion secondary battery) has excellent battery characteristics, with low surface pressure dependence of battery resistance, and hence the battery can be suitably used, in particular, as a power source of a motor (electric motor) installed in a vehicle such as an automobile. Accordingly, the present invention provides a vehicle (typically, an automobile, in particular an automobile provided with an electric motor, for instance a hybrid automobile, an electric automobile or a fuel cell automobile) that is provided with such a battery 100 (which may be typically in the form of an assembled battery resulting from connecting in series a plurality of batteries 100) as a power source.

INDUSTRIAL APPLICABILITY

The herein disclosed battery can provide a battery which exhibits less fluctuation in battery resistance.

The invention claimed is:

1. A lithium ion secondary battery, comprising an electrode assembly resulting from stacking a positive electrode, a separator and a negative electrode,
   wherein the battery comprises, as the separator, a first separator and a second separator having mutually different characteristics, the first separator and the second separator being disposed inside the electrode assembly in a state where the first separator and the second separator are not in contact with each other in a stacking direction of the electrode assembly,
   a given surface pressure is applied in the stacking direction of the electrode assembly, and the first separator and the second separator have the following characteristic:

in a case where the battery is constructed comprising an electrode assembly that results from stacking the positive electrode, the first separator and the negative electrode, a resistance increase rate X=Delta X/Delta P satisfies X>0 (positive value), X being worked out from a change amount Delta P (MPa) of surface pressure applied in the stacking direction of the electrode assembly and a IV resistance increment Delta X (%) of the battery upon application of the surface pressure change amount Delta P, and in a case where the battery is constructed comprising an electrode assembly that results from stacking the positive electrode, the second separator and the negative electrode, a resistance increase rate Y=Delta Y/Delta P satisfies Y<0 (negative value), Y being worked out from a change amount Delta P (MPa) of surface pressure applied in the stacking direction of the electrode assembly and a resistance increment Delta Y (%) of the battery upon application of the surface pressure change amount Delta P, wherein the IV resistance is worked out on the basis of the difference between the voltage value (initial voltage value) before charge and discharge at a current value of 30 C in an environment at 25 degrees Celsius, and a voltage value at a point in time after 10 seconds had elapsed since the initial voltage value, and the resistance increase rate X is calculated from the slopes in the graph that denotes the correlation between surface pressure and IV resistance.

2. The lithium ion secondary battery according to claim 1, wherein a relationship $$-0.8 Y/X \leq (S1/S2) \leq -1.2 Y/X \qquad \text{[Math. 1]}$$

is satisfied by a surface area ratio (S1/S2), where S1 denotes a surface area of a region at which the first separator and the positive electrode oppose each other, and S2 denotes a surface area of a region at which the second separator and the positive electrode oppose each other.

3. The lithium ion secondary battery according to claim 1, wherein the first separator is formed from a polyolefin resin, and the second separator is formed from a nonwoven fabric.

4. The lithium ion secondary battery according to claim 1, wherein the electrode assembly is a stacked electrode assembly resulting from repeatedly stacking the positive electrode, the first separator, the negative electrode and the second separator in this order.

5. The lithium ion secondary battery according to claim 1, wherein the electrode assembly is a wound electrode assembly resulting from stacking the positive electrode, the first separator, the negative electrode and the second separator in this order, and winding the resulting stack.

* * * * *